(12) United States Patent
Guyton et al.

(10) Patent No.: US 9,720,116 B2
(45) Date of Patent: Aug. 1, 2017

(54) LAND BASED UNIT FOR SEISMIC DATA ACQUISITION

(71) Applicant: Fairfield Industries Incorporated, Sugar Land, TX (US)

(72) Inventors: William Guyton, Sugarland, TX (US); John C. Downey, Houston, TX (US); Geoff Rice, Sugarland, TX (US); Christopher T. Nikirk, Jersey Villiage, TX (US)

(73) Assignee: FAIRFIELD INDUSTRIES INCORPORATED, Sugar Land, TX (US)

( * ) Notice: Subject to any disclaimer, the term of this patent is extended or adjusted under 35 U.S.C. 154(b) by 716 days.

(21) Appl. No.: 13/803,339

(22) Filed: Mar. 14, 2013

(65) Prior Publication Data

US 2014/0126329 A1    May 8, 2014

Related U.S. Application Data

(60) Provisional application No. 61/722,024, filed on Nov. 2, 2012.

(51) Int. Cl.
*G01V 1/16* (2006.01)
*G01V 1/18* (2006.01)
*G01V 1/24* (2006.01)

(52) U.S. Cl.
CPC ............... *G01V 1/18* (2013.01); *G01V 1/247* (2013.01); *G01V 1/16* (2013.01)

(58) Field of Classification Search
CPC .......... G01V 1/38; G01V 1/181; G01V 1/166; G01V 2210/1427; G01V 1/247; G01V 1/16; G01V 1/18

USPC .......................................... 367/76, 178, 188
See application file for complete search history.

(56) References Cited

U.S. PATENT DOCUMENTS

| 2,990,160 A | | 6/1961 | Foley |
| 4,236,234 A | | 11/1980 | McDavid et al. |
| 4,637,001 A | | 1/1987 | Annoot |
| 5,189,642 A | * | 2/1993 | Donoho .................. G01V 1/38 |
| | | | 181/122 |

(Continued)

FOREIGN PATENT DOCUMENTS

| AU | 198062243 A | 2/1982 |
| AU | 2005226060 B2 | 10/2005 |

(Continued)

OTHER PUBLICATIONS

International Search Report and Written Opinion in International Application PCT/US2013/067938 mailed Jan. 12, 2015 (16 pages).

(Continued)

*Primary Examiner* — Ian J Lobo
(74) *Attorney, Agent, or Firm* — Foley & Lardner LLP; James De Vellis

(57) ABSTRACT

In one aspect, a seismic data acquisition unit is disclosed including a closed housing containing: a seismic sensor; a processor operatively coupled to the seismic sensor; a memory operatively coupled to the processor to record seismic data from the sensor; and a power source configured to power the sensor, processor and memory. The sensor, processor, memory and power source are configured to be assemble as an operable unit in the absence of the closed housing.

20 Claims, 8 Drawing Sheets

(56) References Cited

U.S. PATENT DOCUMENTS

| | | |
|---|---|---|
| 5,253,223 A * | 10/1993 | Svenning .................. G01V 1/16 181/122 |
| 6,587,055 B1 | 7/2003 | Turner et al. |
| 6,701,133 B1 | 3/2004 | Bennett et al. |
| 7,104,728 B2 | 9/2006 | Luc et al. |
| 7,124,028 B2 | 10/2006 | Ray et al. |
| 7,135,976 B2 | 11/2006 | Neff et al. |
| 7,224,641 B2 | 5/2007 | Nas |
| 7,254,093 B2 | 8/2007 | Ray et al. |
| 7,286,442 B2 | 10/2007 | Ray et al. |
| 7,310,287 B2 | 12/2007 | Ray et al. |
| 7,324,406 B2 | 1/2008 | Berg |
| 7,433,265 B2 | 10/2008 | Craft et al. |
| 7,529,627 B2 | 5/2009 | Lisitsyn et al. |
| 7,561,493 B2 | 7/2009 | Ray et al. |
| 7,602,667 B2 | 10/2009 | Thompson |
| 7,632,043 B2 | 12/2009 | Thompson et al. |
| 7,639,564 B2 | 12/2009 | Paffenholz et al. |
| 7,646,670 B2 | 1/2010 | Maxwell et al. |
| 7,649,803 B2 | 1/2010 | Ray et al. |
| 7,668,047 B2 | 2/2010 | Ray et al. |
| 7,675,821 B2 | 3/2010 | Berg et al. |
| 7,724,607 B2 | 5/2010 | Ray et al. |
| 7,728,596 B2 | 6/2010 | Lisitsyn et al. |
| 7,765,947 B2 | 8/2010 | Thompson et al. |
| 7,804,737 B2 | 9/2010 | Thompson |
| 7,825,803 B2 | 11/2010 | Neff et al. |
| 7,933,165 B2 | 4/2011 | Thompson et al. |
| 7,953,326 B2 | 5/2011 | Farr et al. |
| 7,953,556 B2 | 5/2011 | Craft et al. |
| 7,965,583 B2 | 6/2011 | Thomas |
| 7,983,847 B2 | 7/2011 | Ray et al. |
| 7,986,589 B2 | 7/2011 | Ray et al. |
| 7,990,803 B2 | 8/2011 | Ray et al. |
| 8,050,140 B2 | 11/2011 | Ray et al. |
| 8,075,226 B2 | 12/2011 | Thompson et al. |
| 8,076,941 B2 | 12/2011 | Tulupov et al. |
| 8,076,942 B2 | 12/2011 | Tulupov et al. |
| 8,259,534 B2 | 9/2012 | Lisitsyn et al. |
| 8,576,658 B2 | 11/2013 | Thomas |
| 9,052,380 B2 | 6/2015 | Winter et al. |
| 9,090,319 B2 | 7/2015 | Brizard et al. |
| 9,110,187 B2 * | 8/2015 | Muyzert .................. G01V 1/20 |
| 9,151,857 B2 | 10/2015 | Manin et al. |
| 9,381,986 B2 | 7/2016 | Brizard |
| 9,429,671 B2 | 8/2016 | Rokkan et al. |
| 9,448,311 B2 | 9/2016 | Maxwell |
| 9,457,879 B2 | 10/2016 | Brizard |
| 9,459,366 B2 | 10/2016 | Henman et al. |
| 9,494,700 B2 | 11/2016 | Henman et al. |
| 9,523,780 B2 | 12/2016 | Naes et al. |
| 9,541,663 B2 | 1/2017 | Rokkan et al. |
| 2003/0218936 A1 | 11/2003 | Chamberlain |
| 2004/0233054 A1 | 11/2004 | Neff et al. |
| 2004/0257913 A1 | 12/2004 | Ray et al. |
| 2005/0052951 A1 | 3/2005 | Ray et al. |
| 2005/0114033 A1 | 5/2005 | Ray et al. |
| 2005/0259516 A1 | 11/2005 | Ray et al. |
| 2005/0276162 A1 | 12/2005 | Brinkmann et al. |
| 2006/0120216 A1 | 6/2006 | Ray et al. |
| 2006/0159524 A1 | 7/2006 | Thompson et al. |
| 2006/0212226 A1 | 9/2006 | Ray et al. |
| 2006/0243189 A1 | 11/2006 | Thompson et al. |
| 2007/0070808 A1 | 3/2007 | Ray et al. |
| 2007/0076525 A1 | 4/2007 | Craft et al. |
| 2007/0085677 A1 | 4/2007 | Neff et al. |
| 2007/0258774 A1 | 11/2007 | Thompson et al. |
| 2008/0041296 A1 | 2/2008 | Thompson et al. |
| 2008/0106977 A1 | 5/2008 | Ray et al. |
| 2008/0137484 A1 | 6/2008 | Scott |
| 2008/0137485 A1 | 6/2008 | Thompson |
| 2008/0181055 A1 | 7/2008 | Ray et al. |
| 2008/0192569 A1 | 8/2008 | Thompson |
| 2008/0221801 A1 | 9/2008 | Craft et al. |
| 2008/0279636 A1 | 11/2008 | Ray et al. |
| 2008/0310850 A1 * | 12/2008 | Pederson .......... G07C 9/00158 398/135 |
| 2009/0016157 A1 | 1/2009 | Ray et al. |
| 2009/0027999 A1 | 1/2009 | Ray et al. |
| 2009/0052992 A1 | 2/2009 | Thompson et al. |
| 2009/0080290 A1 | 3/2009 | Ray et al. |
| 2009/0180351 A1 | 7/2009 | Paffenholz et al. |
| 2009/0225629 A1 | 9/2009 | Ray |
| 2009/0290453 A1 | 11/2009 | Ray et al. |
| 2010/0027380 A1 * | 2/2010 | Samuelson .............. F17D 5/06 367/188 |
| 2010/0039892 A1 | 2/2010 | Ray et al. |
| 2010/0054078 A1 | 3/2010 | Thompson et al. |
| 2010/0054079 A1 | 3/2010 | Thompson et al. |
| 2010/0054860 A1 | 3/2010 | Thompson et al. |
| 2010/0157727 A1 | 6/2010 | Woodard et al. |
| 2010/0278009 A1 | 11/2010 | Thompson et al. |
| 2010/0293245 A1 | 11/2010 | Ray et al. |
| 2010/0302909 A1 * | 12/2010 | Muyzert ................ G01V 1/184 367/178 |
| 2010/0329076 A1 | 12/2010 | Ray et al. |
| 2011/0032798 A1 | 2/2011 | Ray et al. |
| 2011/0149686 A1 | 6/2011 | Ray et al. |
| 2011/0286800 A1 | 11/2011 | Thompson et al. |
| 2013/0083622 A1 | 4/2013 | Herrmann et al. |
| 2013/0215714 A1 | 8/2013 | Meunier |
| 2014/0251199 A1 | 9/2014 | Brizard |
| 2014/0301161 A1 | 10/2014 | Brizard et al. |
| 2015/0003194 A1 | 1/2015 | Brizard |
| 2015/0316675 A1 | 11/2015 | Brizard et al. |
| 2015/0336645 A1 | 11/2015 | Brizard et al. |
| 2015/0336646 A1 | 11/2015 | Brizard et al. |
| 2015/0338433 A1 | 11/2015 | Valsvik et al. |
| 2015/0362606 A1 | 12/2015 | Henman et al. |
| 2016/0028238 A1 | 1/2016 | Isfeldt |
| 2016/0041280 A1 | 2/2016 | Naes et al. |
| 2016/0041284 A1 | 2/2016 | Rokkan et al. |
| 2016/0041285 A1 | 2/2016 | Rokkan et al. |
| 2016/0046358 A1 | 2/2016 | Lelaurin et al. |
| 2016/0056645 A1 | 2/2016 | Henman et al. |
| 2016/0094298 A1 | 3/2016 | Isfeldt et al. |
| 2016/0121983 A1 | 5/2016 | Rokkan et al. |
| 2016/0124105 A1 | 5/2016 | Valsvik et al. |
| 2016/0245945 A1 | 8/2016 | Rokkan et al. |
| 2016/0280345 A1 | 9/2016 | Brizard |
| 2016/0341840 A1 | 11/2016 | Rokkan et al. |
| 2016/0349386 A1 | 12/2016 | Naes |
| 2016/0349387 A1 | 12/2016 | Rokkan et al. |
| 2016/0363678 A1 | 12/2016 | Maxwell |
| 2016/0377757 A1 | 12/2016 | Henman et al. |
| 2017/0017003 A1 | 1/2017 | Naes et al. |
| 2017/0017008 A1 | 1/2017 | Henman et al. |
| 2017/0031046 A1 | 2/2017 | Rokkan et al. |

FOREIGN PATENT DOCUMENTS

| | | |
|---|---|---|
| BR | 0508185 | 7/2009 |
| CA | 1131338 A1 | 9/1982 |
| CA | 1187594 A1 | 5/1985 |
| CA | 2547062 A1 | 6/2005 |
| CA | 2554788 A1 | 8/2005 |
| CA | 2568245 A1 | 10/2005 |
| CA | 2581193 A1 | 4/2006 |
| CA | 2595185 A1 | 7/2006 |
| CA | 2606712 A1 | 11/2006 |
| CA | 2700280 A1 | 5/2009 |
| CA | 2724987 A1 | 11/2009 |
| CA | 2568245 C | 8/2011 |
| CN | 101057160 A | 10/2007 |
| CN | 100401102 C | 7/2008 |
| CN | 101365964 A | 2/2009 |
| CN | 101535119 A | 9/2009 |
| CN | 100592104 C | 2/2010 |
| CN | 101825721 B | 2/2012 |
| CN | 1947031 B | 5/2012 |
| CN | 101836132 B | 9/2012 |
| CN | 102084269 B | 4/2014 |
| EA | 10438 B1 | 8/2008 |
| EP | 0 576 75 B1 | 2/1987 |

(56) References Cited

FOREIGN PATENT DOCUMENTS

| | | |
|---|---|---|
| EP | 1 846 288 A2 | 12/2013 |
| FR | 2770700 A1 | 5/1999 |
| FR | 2770732 A1 | 5/1999 |
| GB | 2 055 467 A | 3/1981 |
| GB | 2 056 222 A | 3/1981 |
| GB | 2 056 224 B | 3/1981 |
| GB | 2 081 446 A | 2/1982 |
| GB | 2 331 664 A | 5/1999 |
| GB | 2 332 994 A | 7/1999 |
| GB | 2 332 994 B | 3/2002 |
| GB | 2 331 664 B | 7/2002 |
| GB | 2 392 245 | 2/2004 |
| GB | 2 482 584 | 2/2012 |
| IT | 1171409 B | 6/1987 |
| JP | 2007-531936 A | 11/2007 |
| JP | 04-794548 B2 | 10/2011 |
| MX | 147549 A | 12/1982 |
| MX | 06008582 A | 8/2007 |
| MX | 2007013817 A | 1/2008 |
| MX | 2007008695 A | 3/2008 |
| MX | 2007003290 A | 10/2008 |
| OA | 6582 A | 7/1981 |
| OA | 6589 A | 8/1981 |
| RU | 2006121992 A | 12/2007 |
| RU | 2006130746 A | 3/2008 |
| RU | 2333516 C2 | 9/2008 |
| RU | 2007131268 A | 2/2009 |
| RU | 2352960 C2 | 4/2009 |
| RU | 2007144713 A | 6/2009 |
| RU | 2416810 C2 | 4/2011 |
| RU | 2010115753 A | 10/2011 |
| WO | WO-80/02877 A1 | 12/1980 |
| WO | WO-82/00365 A1 | 2/1982 |
| WO | WO-99/23509 A1 | 5/1999 |
| WO | WO-99/23759 A1 | 5/1999 |
| WO | WO-2005/057237 A2 | 6/2005 |
| WO | WO-2005/074426 A2 | 8/2005 |
| WO | WO-2005/093456 A1 | 10/2005 |
| WO | WO-2005/119299 A1 | 12/2005 |
| WO | WO-2006/041438 A1 | 4/2006 |
| WO | WO-2006/078644 A2 | 7/2006 |
| WO | WO-2006/119187 A2 | 11/2006 |
| WO | WO-2007/041720 A2 | 4/2007 |
| WO | WO-2008/093169 | 8/2008 |
| WO | WO-2008/112462 A2 | 9/2008 |
| WO | WO-2009/026002 A1 | 2/2009 |
| WO | WO-2009/066144 A2 | 5/2009 |
| WO | WO-2009/089347 A1 | 7/2009 |
| WO | WO-2009/142676 A1 | 11/2009 |
| WO | WO-2010/025283 A2 | 3/2010 |
| WO | WO-2010/027946 A2 | 3/2010 |
| WO | WO-2010/027966 A2 | 3/2010 |
| WO | WO-2010/075302 A2 | 7/2010 |
| WO | WO-2010/105104 A2 | 9/2010 |
| WO | WO-2011/139159 | 11/2011 |

OTHER PUBLICATIONS

Examination Report for AU 2013337722 dated May 12, 2016.
First Office Action for MX/a/2015/005529 issued Jul. 11, 2016.

* cited by examiner

LAND BASED UNIT FOR SEISMIC DATA ACQUISITION

CROSS-REFERENCE TO RELATED PATENT APPLICATIONS

The present application claims the benefit of U.S. Provisional Application No. 61/722,024 filed Nov. 2, 2012, the entire contents of which are incorporated herein by reference.

The present disclosure is also related to the subject matter found in the U.S. and International Applications listed in Appendix A, the entire contents of each of which are incorporated herein by reference.

BACKGROUND OF THE INVENTION

The following section is presented for informational purposes only. The inclusion of material in this section should not be considered to be an admission that such material is prior art to the present application.

Seismic data collection systems deployable on land are known in the prior art. Such systems typically comprises a plurality of distributed receivers, i.e., geophones, connected in a parallel series combination on a single twisted pair of wires to form a single receiver group or channel for a station. During the data collection process, the output from each channel is digitized at the station and either stored or transmitted back to a central location for subsequent analysis. Commonly, cable telemetry is used for data transmission between the individual receivers, the stations and the central location. Other systems use wireless methods for data transmission stations and are not connected to each other. Still other systems temporarily store the data at each station until the data is extracted.

SUMMARY OF THE INVENTION

The present disclosure provides a system, e.g., a land based system, for collecting seismic data by deploying multiple, autonomous, wireless, self-contained seismic recording units or pods. Seismic data previously recorded by the node can be retrieved and the node can be charged, tested, resynchronized, and operation can be re-initiated without the need to open the node.

Aspects and implementations of the present disclosure are directed to a land based unit for seismic data acquisition.

In one aspect, a seismic data acquisition unit is disclosed including a closed housing containing: a seismic sensor; a processor operatively coupled to the seismic sensor; a memory operatively coupled to the processor to record seismic data from the sensor; and a power source configured to power the sensor, processor and memory.

In some implementations, the sensor, processor, memory and power source are configured to be assemble as an operable unit in the absence of the closed housing.

In some implementations, the housing includes a cap having one or more pins that provide electrical connection to one or more elements contained in the housing.

Some implementations include a flexible electrical connector member disposed under the cap in the closed housing configured to provide electrical connection between the pin and the one or more elements contained in the housing. In some implementations, the flexible electrical connector is configured to flex in response to a deformation of the cap without causing an interruption of the electrical connection between the pin and to one or more elements contained in the housing.

Some implementations include a connection port configured to allow one or more external seismic sensors to be operatively coupled to the processor contained in the closed housing.

Some implementations include a light emitting element included in the housing and operatively coupled to the processor. In some implementations, the processor is configured to modulate the output of the light emitting element to transmit data to a receiver external to the sensor. In some implementations, the receiver external to the sensor is mounted on a vehicle.

In another aspect, a system is disclosed including a unit of the type described in the above paragraph, and the receiver.

In another aspect, a method is disclosed including deploying a seismic data acquisition unit of any of the types described herein and acquiring seismic data using the unit.

Various implementations may include any of the above described devices, techniques, etc., either alone or in any suitable combination.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DETAILED DESCRIPTION OF THE PREFERRED EMBODIMENTS

Following below are more detailed descriptions of various concepts related to, and implementations of, seismic data acquisition devices. The various concepts introduced above and discussed in greater detail below may be implemented in any of numerous ways, as the described concepts are not limited to any particular manner of implementation. Examples of specific implementations and applications are provided primarily for illustrative purposes.

Figure 1A:
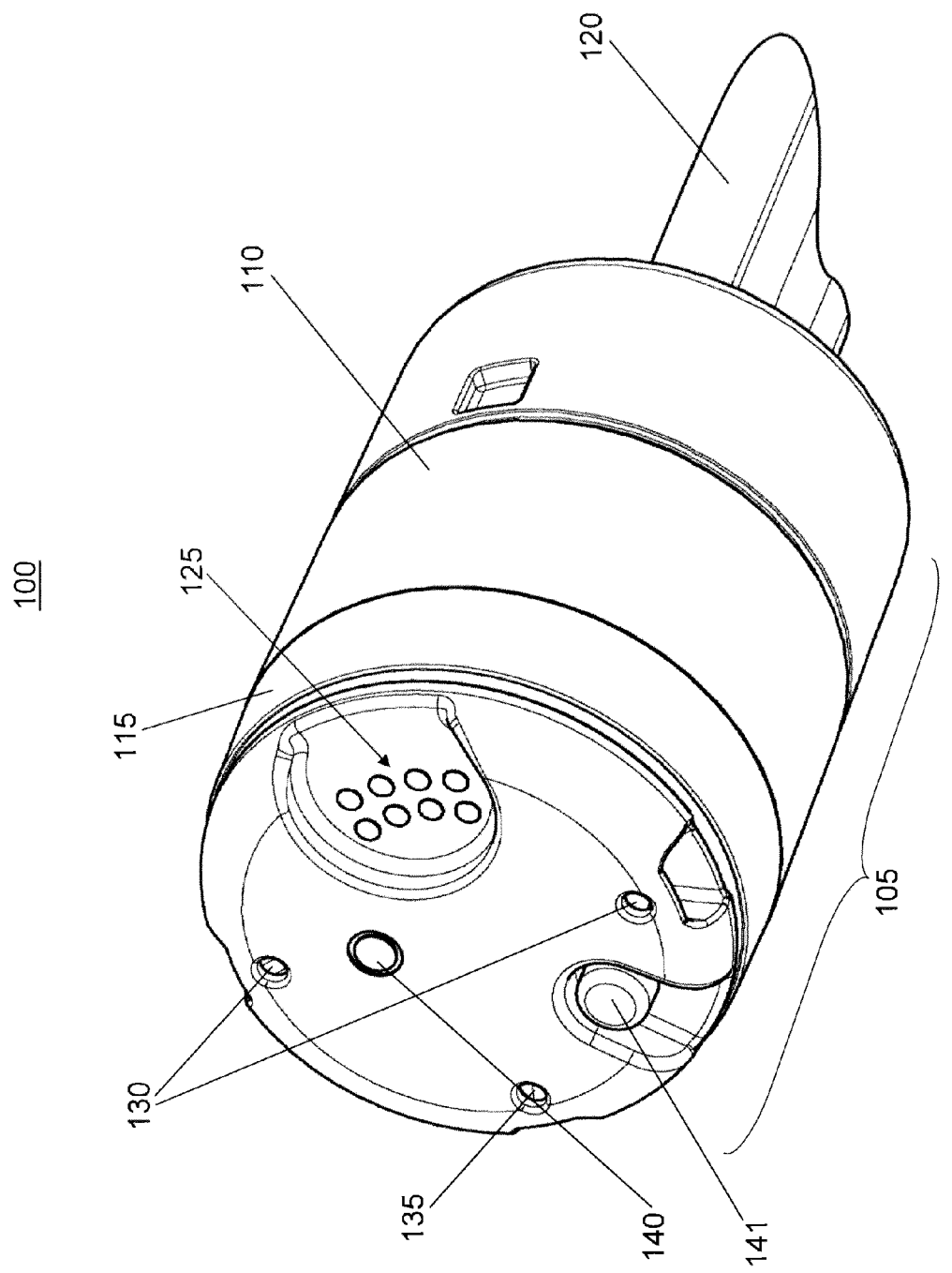
FIG. 1A is a perspective view of a first implementation of a seismic data acquisition unit, according to an illustrative implementation.

FIG. 1A is a perspective view of a first implementation of a seismic data acquisition unit 100, according to an illustrative implementation. The unit 100 is suitable for use on dry land, and can be used to sense and store data relating to seismic activity, e.g., seismic signals generated during a seismic survey. In some implementations, a plurality of units such as unit 100 can be deployed over a relatively large geographic area. Seismic data can be collected by each unit 100 and all of the resulting data can be used to determine characteristics of the geological structure beneath the surface of the ground in the geographic area.

The unit 100 includes a case 105 with a lower container section 110 mated to an upper cap section 115. The bottom of the lower container section 110 is coupled to a top end of a stake 120, which can be aligned with the major axis of the case 105. The bottom end of the stake 120 includes a sharp point to allow the stake to penetrate the surface of the ground. In some implementations, the stake 120 is made from an electrically conductive material, such as a metal, so that electronics inside the case 105 can be electrically grounded through the stake 120. In some implementations, the stake 120 augments the seismic coupling between the unit 100 and the ground.

In some embodiments, the outer surface of the cap section 115 may be substantially smooth, e.g., free or ribs or other features that may promote the accumulation of dirt or other material when the unit is deployed in the field. In some embodiments, the underside of the cap section 115 may include ribs or other features (not shown) that may, for example, provide increased rigidity or mechanical strength to the cap section 115.

For some seismic applications, it is desirable for the case to be radially symmetric, in order to avoid directionally dependent distortion of seismic waves transmitted through the case. This can help to reduce errors in the seismic data detected by the unit 100. In some implementations, the case 105 can be substantially cylindrical in shape. In other implementations, the outer edge of the case 105 can include flat walls, such that the case 105 has a polygonal cross-section. For example, the case 105 can have a square, hexagonal, octagonal, or other polygonal cross-section. The lengths of the sides in case 105 having a polygonal cross-section can be equal, allowing the case to approximate the radial symmetry of a cylinder. That is in some embodiments, the case 105 may be symmetric or substantially symmetric under rotations about a central axis, either continuously or by discrete angles.

The container section 110 can be coupled to the cap section 115 by a press fitting mechanism. For example, the diameter of a lower portion of the cap section 120 can be slightly smaller than the diameter of the container a top portion of the container section 115, and the cap section 120 can be pressed into the container section 115 and held in place by the friction between the container section 110 and the cap section 115. As shown the container section 110 and the cap section 115 include interlocking features that further secure the pieces together. The features 116 may be shaped such that the assembly force required to bring the section together is less than the disassembly force required to separate them. For example, as shown the features 116 include sloping ramp portion that facilitate assemble, and flat portions that inhibit disassembly. An O-ring 175 is provided at the fitting to further seal and isolate the interior of the unit 100 (e.g., providing a water or even air tight seal). As shown, the cap and container sections 110, 115 are shaped to form a void when assembled where the O-ring 175 may reside. This void may be shaped to provide a selected amount of compression on the O-ring 174. The cap and cap and container sections 110, 115 may include an addition interlocking feature 117 that further promotes the integrity of the seal between the sections, e.g., in the presence of a mechanical shock.

The container section 110 and the cap section 115 can be made from a weather-resistant material such as plastic, composite, or metal in order to increase durability. In some implementations, the container section 110 and the cap section 115 are formed by an injection molding process. In some such implementations, the features 116 and 117 may be formed entirely through the molding process, without the need for additional machining steps.

The top surface of the cap section 115 includes electrical pins 125. In some implementations, eight electrical pins 125 are provided. The pins 125 extend into the interior of the unit 100, and may be input pins or output pins providing a communication path between electronics located within the unit 100 and other external equipment. For example, some of the pins 125 can be used by an external computer to read data from a memory module inside the unit 100. In another example, electronics inside the unit 100 may be programmed by receiving input signals from external equipment through the pins 125. In still another example, an external power source an be connected to one or more of the pins 125 in order to provide power to electrical components inside the unit 100 (e.g., for charging a battery).

The electrical pins 125 can be configured such that the upper surfaces of the pins 125 are flush with the upper surface of the cap section 115. When the unit 100 is deployed for use in the field, the outer surfaces of the unit 100 can be exposed to weather and environmental conditions such as dirt, debris, and rain. The flush alignment of the electrical pins 125 with the surface of the cap section 115 can therefore provide several benefits. For example, the pins 125 are completely surrounded by the cap section 115, which provides protection from mechanical stress to the pins 125, while also reducing the likelihood that debris will accumulate around the pins, as would occur if the pins 125 were recessed into the surface of the cap section 115.

The top surface of the cap section 115 can include openings 130, which can be joined by a channel beneath the top surface of the cap section 115. The openings 130 can be located near the outer edge of the cap section 115, across a diameter of the cap section 115. In some implementations, a lanyard or rope can be inserted through openings 130 and the channel by which they are joined, so that the unit 100 can be transported more easily. A hole 135 can also be included on the top surface of the cap section 115. In some implementations, a locking mechanism can be coupled to the opening 135 to prevent theft or accidental loss of the unit 100 when the unit 100 is deployed. For example, the unit 100 can be locked to a tree, a stake driven into the ground, or to another stable structure.

The top surface of the cap section 115 can also include a light source 140. For example, a light pipe formed in the cap section 115 may be used to send light from a light emitting element such as the light emitting diode (LED) 142 located within the unit 100. The LED 142 can be used to easily communicate data without the need to separate the cap section 115 from the container section 110. The LED 142 can transmit data by turning on and off in a predetermined pattern, or by changing colors. The LED 142 can be configured to transmit any amount of data. For example, the LED 142 can communicate a simple message consisting of a small amount of data (e.g., eight bits), such as a status update indicating an estimated remaining battery life, an amount of seismic data collected, an amount of available memory, or any other status-related information. In other examples, the LED 142 can be configured to transmit more complicated messages, such as Quality Assurance data or messages corresponding to seismic data that has been recorded by the unit 100 (e.g., corresponding to a test shot fired before conducting a seismic survey). In some implementations, the LED 142 can transmit information measured in kilobytes, megabytes, gigabytes, or more. The rate at which data is transmitted by the LED 142 can also be variable. For example, the LED can be configured to transmit data at a rate of 1 b/s, 10 b/s, 100 b/s, 1 kB/s, 10 kB/s, 100 kB/s, 1 MB/s, 1 MB/s, 10 MB/s, 100 MB/s, 1 GB/s, or higher.

In some embodiments, the pin elements 125 may be omitted, the light source 140 and LED 142 used to provide the data transfer features previously accomplished through the pins. In some embodiments, charging can be accomplished without the use of the pin or other physical connectors, e.g., using an inductive energy transfer scheme. Accordingly, in some embodiments, all data and power transfer to and/or from the unit 100 may be accomplished using non-contact techniques.

Figure 1B:
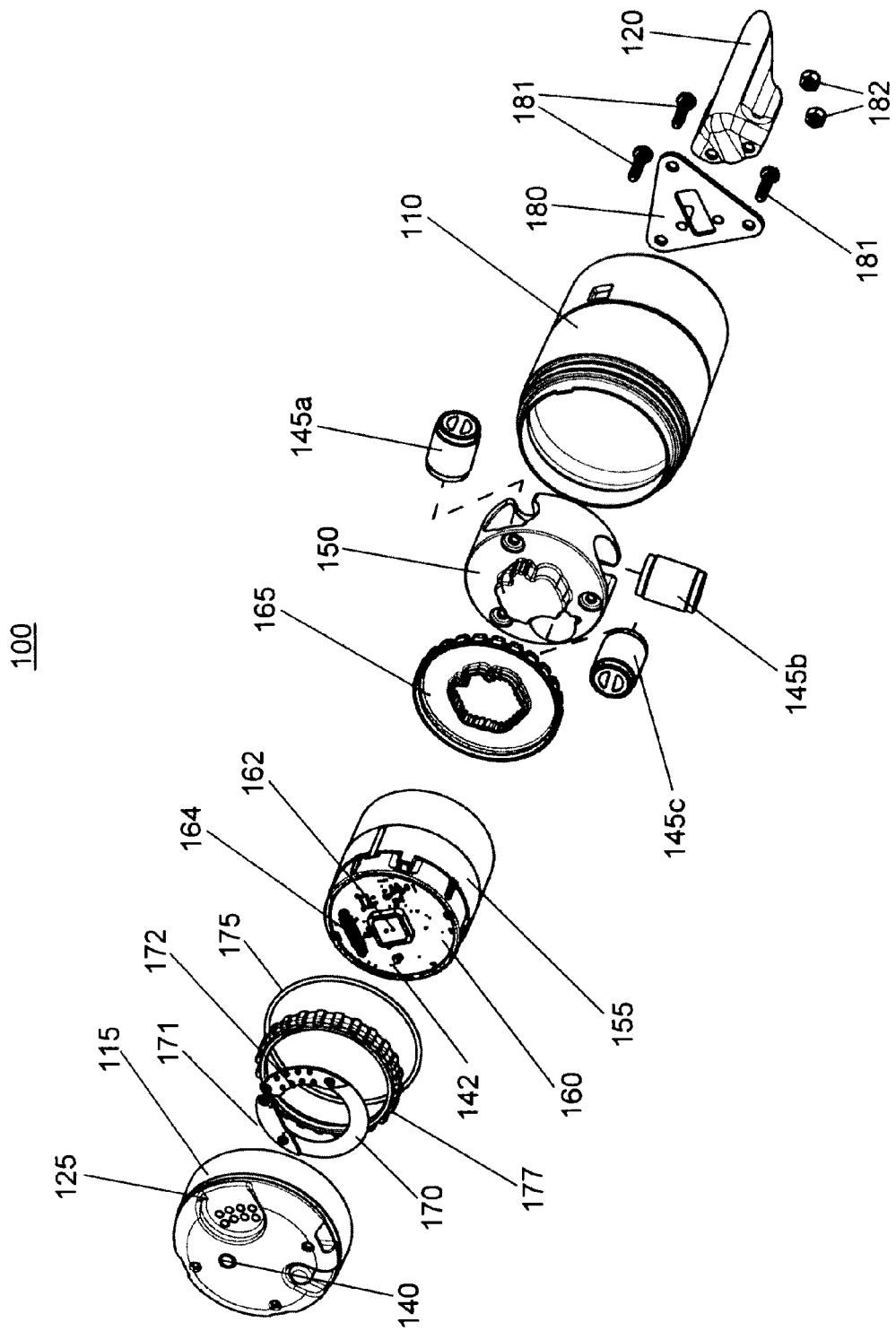
FIG. 1B is an exploded view of the seismic data acquisition unit of FIG. 1A, according to an illustrative implementation.

FIG. 1B is an exploded view of the seismic data acquisition unit 100 of FIG. 1A, according to an illustrative implementation. The container section 110, cap section 115, and stake 120 are shown. Also shown are the internal electronics and structural components, such as geophones 145a-145c. The geophones 145a-145c can be used to sense seismic activity when the unit 100 is deployed for use. In some implementations, each geophone 145 can sense seismic activity in only one axial dimension. Therefore, the unit 100 is configured to contain 3 geophones 145a-145c, each oriented at a right angle to the others, such that a 3-dimensional profile of the seismic activity experienced by the unit 100 can be sensed and recorded. In various implementations, other geophone arrangements may be used, e.g., the Galperin arrangement known in the art.

In other implementations, the geophones 145a-145c may be replaced with any other instrument suitable for sensing seismic activity. A housing 150 is provided for securing the geophones 145a-145c in their fixed orientations. The housing 150 can be formed from a structurally rigid material, such as plastic or metal, and can have a diameter substantially equal to the inner diameter of the container section 110, in which the housing 150 is located.

The cap section 115 may also include a gas vent mechanism 141 (e.g., a one-way check valve) used to relieve pressure in the event of out-gassing from one of the internal components of the unit 100.

The unit 100 also includes first and second circuit boards 155 and 160. These boards can include any suitable arrangement components including one or more processors, memory units, clocks, communications units (e.g., wireless transmitters, receivers, or transceivers), positioning units, battery control electronics, or sensors (e.g., a temperature sensor or battery performance sensor). As shown, an analog-to-digital (A/D) converter circuit board 155 and a global positioning system (GPS) circuit board 160 are provided. Both the A/D board 155 and the GPS board 160 can be substantially circular in shape in order to efficiently use the available space inside the container section 110. Connections from the A/D board 155 and the GPS board 160, such as through direct solder connections or another suitable electrical connector, are provided. The A/D board can also be in electrical communication with the geophones 145a-145c. For example, the geophones 145a-145c can collect seismic data in analog format, and can transmit the analog seismic data to the A/D board 155. The A/D board 155 can then convert the analog seismic data into digital data, which can then be processed by a processor and/or stored in a memory module for later retrieval. The GPS board 160 can include a GPS module 162 and a GPS board connector 164. Location and timing data can be received by the GPS module 162. In some implementations, the timing data can be used for synchronization of data collected by a plurality of units 100. The A/D board 155 and the GPS board 160 can also include other electronic modules that are not displayed in FIG. 1B. For example, a controller for the LED 142 could be included on either board. A structural element 165 separates the housing 150 from the A/D board 155.

The unit 100 may include an upper gasket 177, as well as a lower gasket 165. In some embodiments, the upper and lower gaskets 177 and 165 cooperate to mechanically isolate sensitive components (e.g., boards 155 and 160) from the case 105, e.g., to reduce the possibility of damage due to mechanical shock during transport or deployment. The gaskets may be made of a shock absorbent material, e.g., sorbothane, to provide protection to the internal components of the unit 100.

In some implementations the "stacked" circuit board arrangement described above advantageously reduces or eliminates the need for electrical cables within the unit 100, thereby potentially reducing unwanted noise. In some implementation, all or substantially all of the electronic components in the unit 100 (other than the geophones 145) may be mounted on the circuit boards. Note that although a two board arrangement is shown, one, three, or more boards may be used.

A flexible C-shaped connector 170 provides electrical connections from the GPS board connector 164 to the output pins 125. For example, end 171 of the connector 170 can be coupled to the GPS board connector 164, while end 172 of the connector 170 can be coupled to the output pins 125. The connector 170 can be formed, for example, from thin flexible wires embedded in a flexible insulating material, such as plastic or rubber. The flexibility of connector 170 can help to prevent damage to the connector 170 and to other electrical components in the unit 100. When installing the unit 100 in the field, a technician may apply downward pressure to the top of the cap section 115. For example, the technician may strike the cap section 115 with a mallet or may apply pressure by stepping on the cap section 115 with a foot, in order to drive the stake 120 into the ground. In some instances, the pressure applied to the cap section 115 can cause the cap section 115 (and the attached pins 115) to deform downward. A rigid connector joined to the pins 115 could crack or break under this stress. Because connector 170 is flexible, the cap section 115 can flex without the risk of damage to the connector 170 or other components of the system. Furthermore, the flexibility of the connector enhances the mechanical isolation of the components in the unit 100, e.g., to avoid damage from mechanical shocks such as those that may occur during transportation of the unit 100.

The electronic components of the unit 100, such as the geophones 145, the A/D board 155, the GPS board 160, and the connector 170, can be assembled to form an operable unit separate from the structural elements, such as the stake 120, the container section 110, and the cap section 115. Such an operable unit can be functionally tested before it is installed in the container section 110. This is beneficial because assembly and disassembly of the entire unit 100 can be a time and labor intensive process. Furthermore, in some implementations, the cap section 115 is configured to remain permanently installed after it has been mated to the container section 110. Therefore, testing and/or troubleshooting of the electronic components could be challenging if the components were not able to form an operable unit outside of the container section 110 and the cap section 115.

Although not shown in FIG. 1B, the unit 100 can include a power source. For example, a battery pack comprising a plurality of battery cells can be positioned between the internal components of the unit 100 and the inner wall of the container section 110. In some implementations, the batteries can be rechargeable. The power source can be selected to allow the unit 100 to function without an external power source for an extended period of time (e.g., 30 days or more). The unit 100 also includes a mounting plate 180 coupled to the bottom of the container section 110. The stake 120 can be connected to the mounting plate 180 by bolts 181 and nuts 182.

Figure 1C:
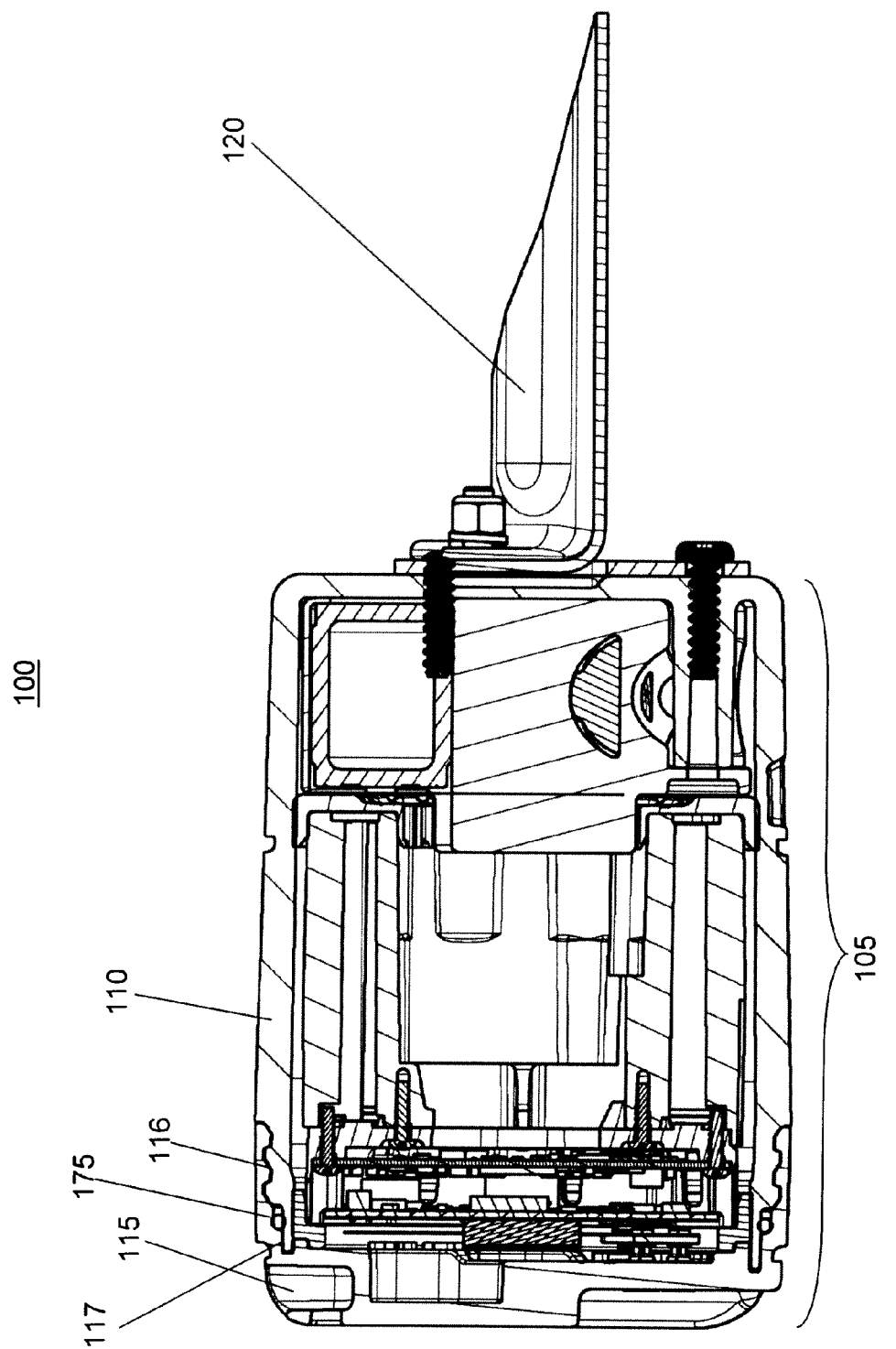
FIG. 1C is a cross-sectional view of the seismic data acquisition unit of FIG. 1A, according to an illustrative implementation.

FIG. 1C is a cross-sectional view of the seismic data acquisition unit 100 of FIG. 1A, according to an illustrative implementation. The case 105 is shown in a closed configuration, with the cap section 115 mated to the container section 110. As discussed above, the stake 120 extends downward from the bottom of the container section 110.

Figure 2A:
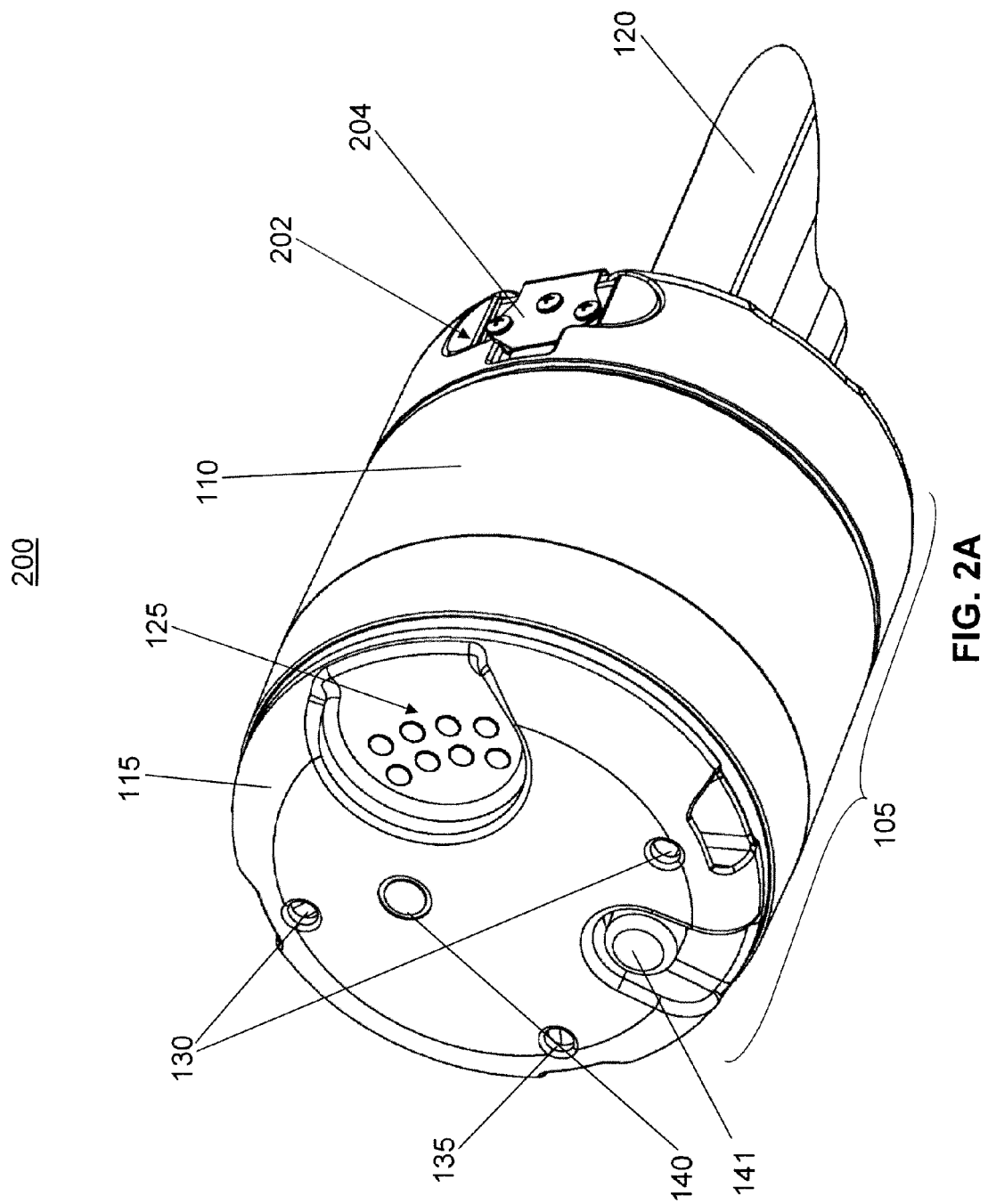
FIG. 2A is a perspective view of a second implementation of a seismic data acquisition unit, according to an illustrative implementation.

FIG. 2A is a perspective view of a second implementation of a seismic data acquisition unit 200, according to an illustrative implementation. The unit 200 has many of the same features as the unit 100 of FIGS. 1A-1C, and is intended to be used for substantially the same purpose. For example, the unit 200 can have a substantially cylindrical shape, as shown in FIG. 2A, or can have a polygonal cross-section as described above in connection with FIG. 1A. The unit 100 can include a case 105 made from a container section 110 and a cap section 115. A stake 120 designed to pierce the surface of the ground can extend from the bottom of the container section 110. The cap section 125 features electrical pins 125, openings 130 and 135, and an LED 140.

The unit 200 can also include an external connector 202. The external connector 202 connects to the internal electronics of the unit 200, and can optionally allow external equipment to communicate with the unit 200.

In some implementations, the external connector 202 may not be used, in which case it can be covered by a protective plate 204. The protective plate 204 can be formed from an electrically conductive material to prevent electrical charge from accumulating at the electrical contacts of the external connector 202. The protective plate 204 can be secured to the external connector 202 with bolts, nails, or any other form of mechanical fastener.

In some implementations, protective plate 204 may include a shorting plug that operates to short or otherwise connect input or output connections on the external connector 202. In some embodiments, the unit 200 is configured to be inoperable unless either the protective plate 204 is attached or the auxiliary cable 206 is attached as described below. This prevents the unit 100 from being deployed with the external connector 202 exposed.

Figure 2B:
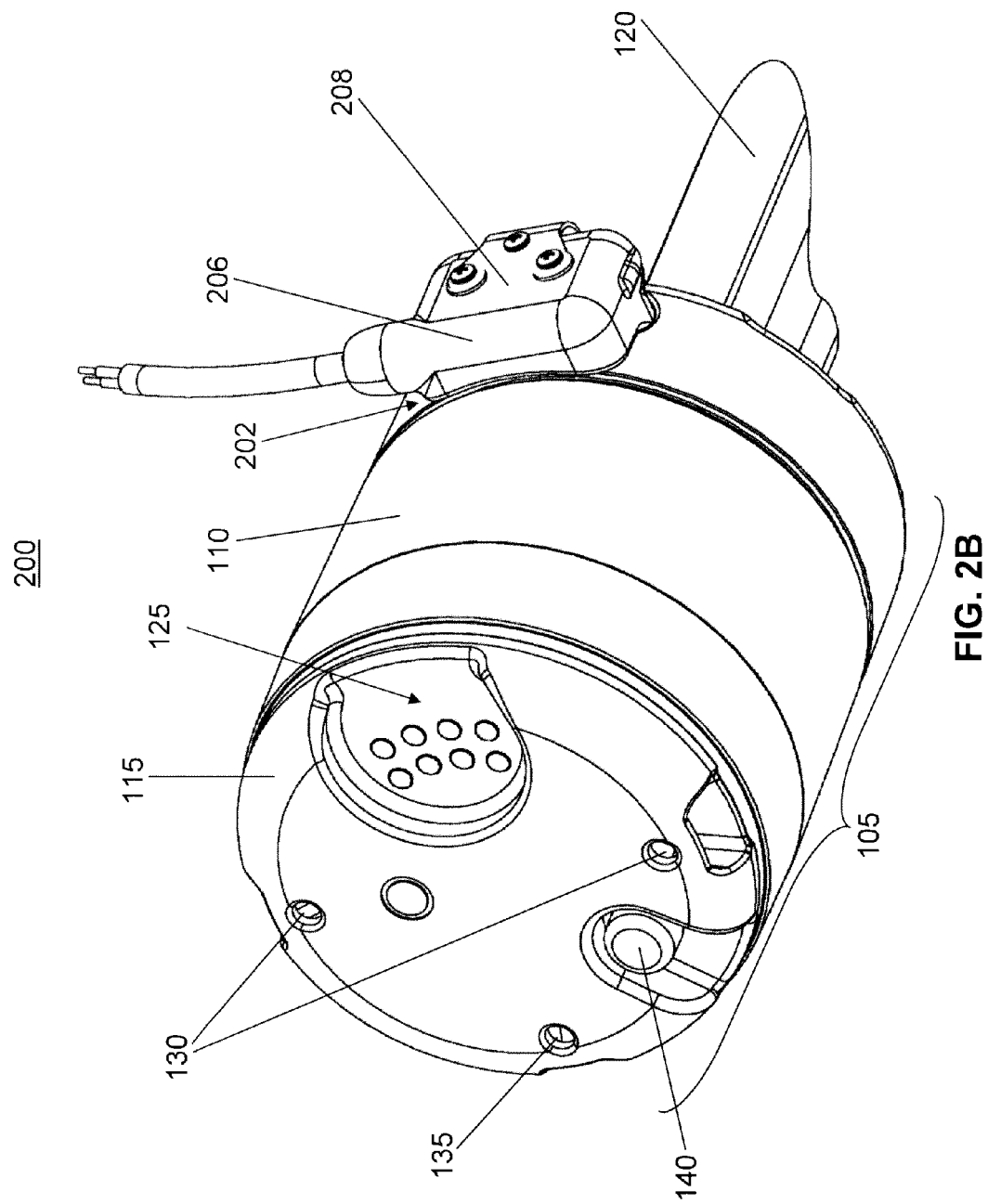
FIG. 2B is a perspective view of the seismic data acquisition unit of FIG. 2A, having an auxiliary cable connected, according to an illustrative implementation.

FIG. 2B is a perspective view of the seismic data acquisition unit 200 of FIG. 2A, having an auxiliary cable 206 connected, according to an illustrative implementation. The auxiliary cable 206 is mechanically and communicatively coupled to the unit 200 via the external connector 202. For example, the auxiliary cable 206 can provide a communication path to one or more additional instruments, such as additional geophones. For example, in some embodiments, analog signals from the geophones may be sent through the cable 206 and connector 202 to the A/D board 155 to be converted into a digital signal for recording. In various implementations, this external geophone signal may be used in addition or alternative to an internal geophone.

Thus, the unit 200 can be an ambidextrous seismic data acquisition unit, in that the connector 202 allows the unit 200 to be used with an internal geophone, any number of external geophones, or both an internal geophone and a number of external geophones. In some implementations, the ambidextrous unit 200 can be reconfigured after it has been installed in the field. For example, the unit 200 can be initially installed with only a single internal geophone, and the connector 202 can be covered by the protective plate 204. A technician may subsequently decide that an external geophone should be added to the unit 200. The technician may then travel to the location of the installed unit 200, remove the protective plate 204, and connect one or more external geophones to the connector 202. The unit 200 can then begin to collect data from both the internal and external geophones without being removed from its original installation location. The external geophones that have been added can also be removed from the unite 200 in the field by a technician at a later time if it is so desired.

A grounding plate 208 is also attached to the auxiliary cable 206. The grounding plate 208 can be formed from an electrically conductive material, and can provide a path to ground in order to protect the unit 200 from voltage or current surges, such as could be experienced if the unit 200 or the external geophones attached to the cable 206 were struck by lightning. The grounding plate 208 can also provide structural support to the auxiliary cable 206. For example, the grounding plate 208 can include a flange that extends under the bottom of the container section 110 to connect to a metal mounting plate on the bottom of the unit 100. The mounting plate can be connected in turn to the stake 120, to provide a path to electrical ground.

Figure 2C:
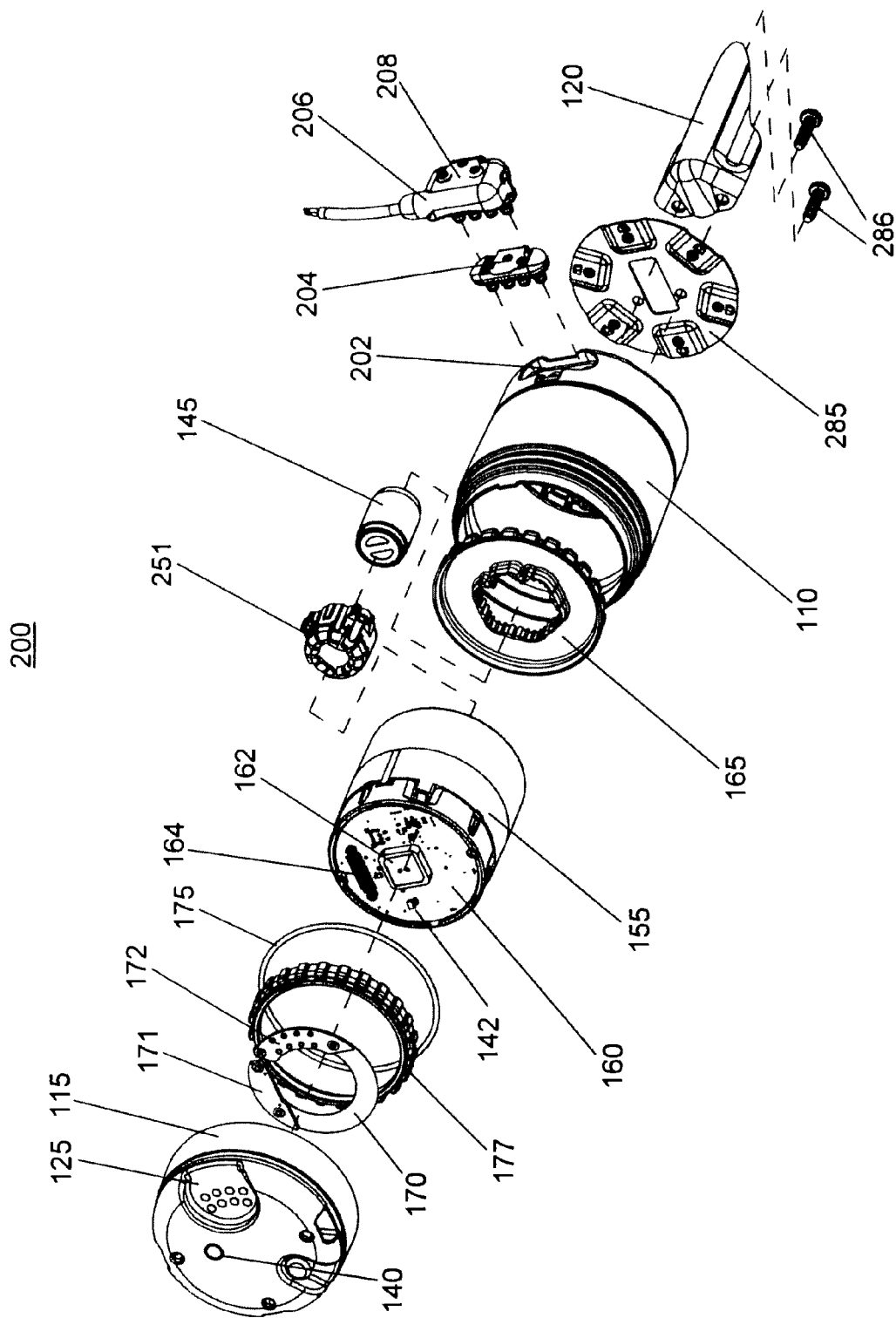
FIG. 2C is an exploded view of the seismic data acquisition unit of FIG. 2A, according to an illustrative implementation.

FIG. 2C is an exploded view of the seismic data acquisition unit 200 of FIG. 2A, according to an illustrative implementation. The unit 200 includes many of the same features as the unit 100, including an A/D board 155, a GPS board 160 with a GPS module 162 and a GPS board connector 164, and a flexible connector 170 for connecting the internal electronics to the electrical pins 125 in the cap section 115.

In contrast to the unit 100 of FIGS. 1A-1C, the unit 200 includes only a single geophone 145. In some implementations, the geophone 145 can be any other kind of instrument capable of collecting seismic data. The seismic data acquisition unit 200 shown in FIG. 2C is illustrative only, and should not be construed as limiting the disclosure. For example, the internal and external components shown in the exploded view of FIG. 2C can be modified in some implementations. In some implementations, the seismic data acquisition unit 200 can include any number of internal geophones. For example, the seismic data acquisition unit 200 can include three geophones, each configured to measure seismic data in one dimension and oriented at a right angle to the other geophones so as to enable the seismic data acquisition unit 200 to collect seismic data in three dimensions using only the internal geophones. In other implementations, the seismic data acquisition unit 200 can includes a single internal geophone device that is configured to record seismic data in three dimensions.

A housing 251 is provided for enclosing and protecting the geophone 145. As previously discussed, the geophone 145 is configured to collect seismic data in only one spatial dimension. For some applications, one-dimensional seismic data may be insufficient, or there may be other types of data that are desired to be recorded by the unit 200. In these applications, the external connector 202 can be used. For example, additional geophones (i.e., geophones measuring seismic data in dimensions orthogonal to the dimension measured by geophone 145), can be connected to auxiliary cable 206 via external connector 202. Other instruments (e.g., a thermometer, accelerometer, hydrophone, or other instruments), can also be connected to the unit 200 via the cable 206. In some implementations diagnostic equipment, e.g., a geophone tester, may be attached to the unit 200 using the external connector 202, e.g., for Quality Assurance testing.

In implementations where the single geophone 145 is sufficient and the auxiliary cable 206 is unnecessary, the protective plate 204 can be installed in the external connector 202 to protect the external connector 202 from environmental damage.

The unit 200 also includes a mounting plate 285 that is larger than the mounting plate 180 of the unit 100. The larger size of the mounting plate 285 provides more area for the grounding plate 208 to contact in implementations where the auxiliary cable 206 is used. This results in a more reliable connection to electrical ground and increases the stability of the connector attached to auxiliary cable 206. The mounting plate 285 can be secured to the bottom of the container section 110 by bolts 286 or other mechanical fasteners.

Figure 2D:
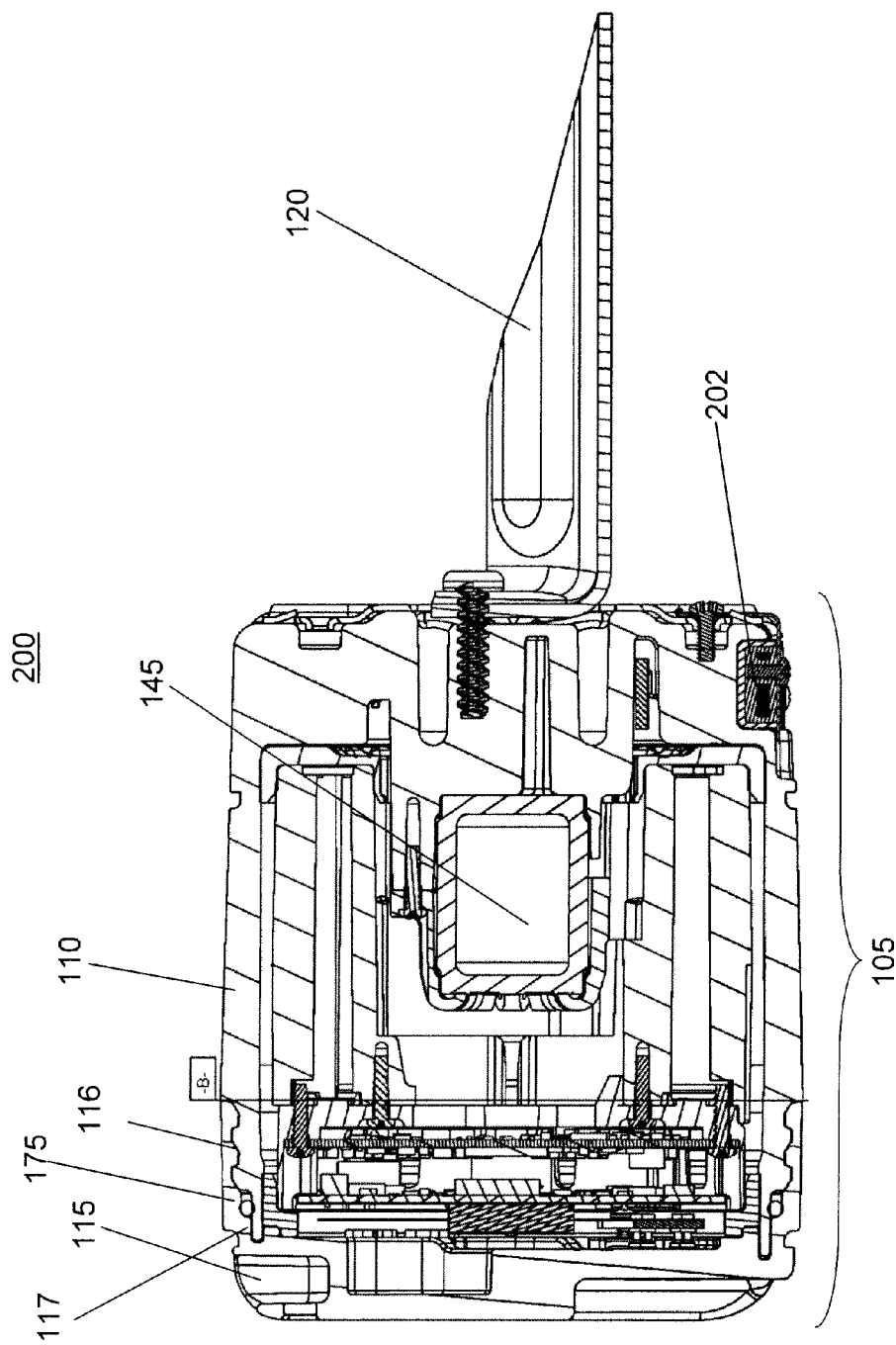
FIG. 2D is a cross-sectional view of the seismic data acquisition unit of FIG. 2A, according to an illustrative implementation.

FIG. 2D is a cross-sectional view of the seismic data acquisition unit 200 of FIG. 2A, according to an illustrative implementation. The case 105 is shown in a closed configuration, with the cap section 115 mated to the container section 110. A single geophone 145 is located within the case 105. The external connector 202 is included on the outside surface of the container section 110. As discussed above, the stake 120 extends downward from the bottom of the container section 110.

In various implementations, the unit 100 or 200 may take advantage of any of the battery capacity and durability prediction, monitoring and control techniques described in U.S. Provisional Patent No. 61/721,962 "BATTERY CAPACITY AND DURABILITY PREDICTION METHOD" filed on even date herewith, the entire contents of which are incorporated by reference herein.

In various implementations, the unit 100 or 200 may operate as semi-autonomous seismic nodes, requiring only an external GPS timing signal for operation. In some implementations, e.g., where a clock such as an atomic clock, is included in the unit, the unit may operate fully autonomously (i.e., requiring no external signals or other intervention while deployed).

Although the examples provided above are focused on land based use, in some implementations, the unit 100 or 200 may be deployed partially or completely underwater. These implementations may be particularly advantageous for seismic surveys of so-called transitional areas between land and water. In some such implementations, unit 200 may be used with one or more hydrophones attached using the external connector 202 to provide combined geophone and hydrophone data recording.

In situations where partial or complete submergence of the unit interferes with the GPS reception of the device, several solutions may be used. As mentioned above, an internal clock may be provided to obviate the need for a GPS timing signal. In other implementations, an external GPS unit may be positioned out of the water in the vicinity of the unit (e.g., on a float, or a nearby riverbank). The external GPS unit may transmit its timing signal (or other data) to the unit using a wired or wireless link. For example, an optical link may be used as described above, or a wired link using external connector 202 on unit 200.

In some implementations, the unit 100 or 200 may be configured to perform automatic self testing. For example, in some embodiments, the unit may periodically (e.g., daily) execute a test routine and store the results in memory. For example, the test routine may include applying an electrical signal (e.g., an impulse or step function signal) to one or more geophones and recording the geophone response. The response data can be processed on board in order to determine the operational status of the unit, or it may be extracted for external processing.

Figure 3:
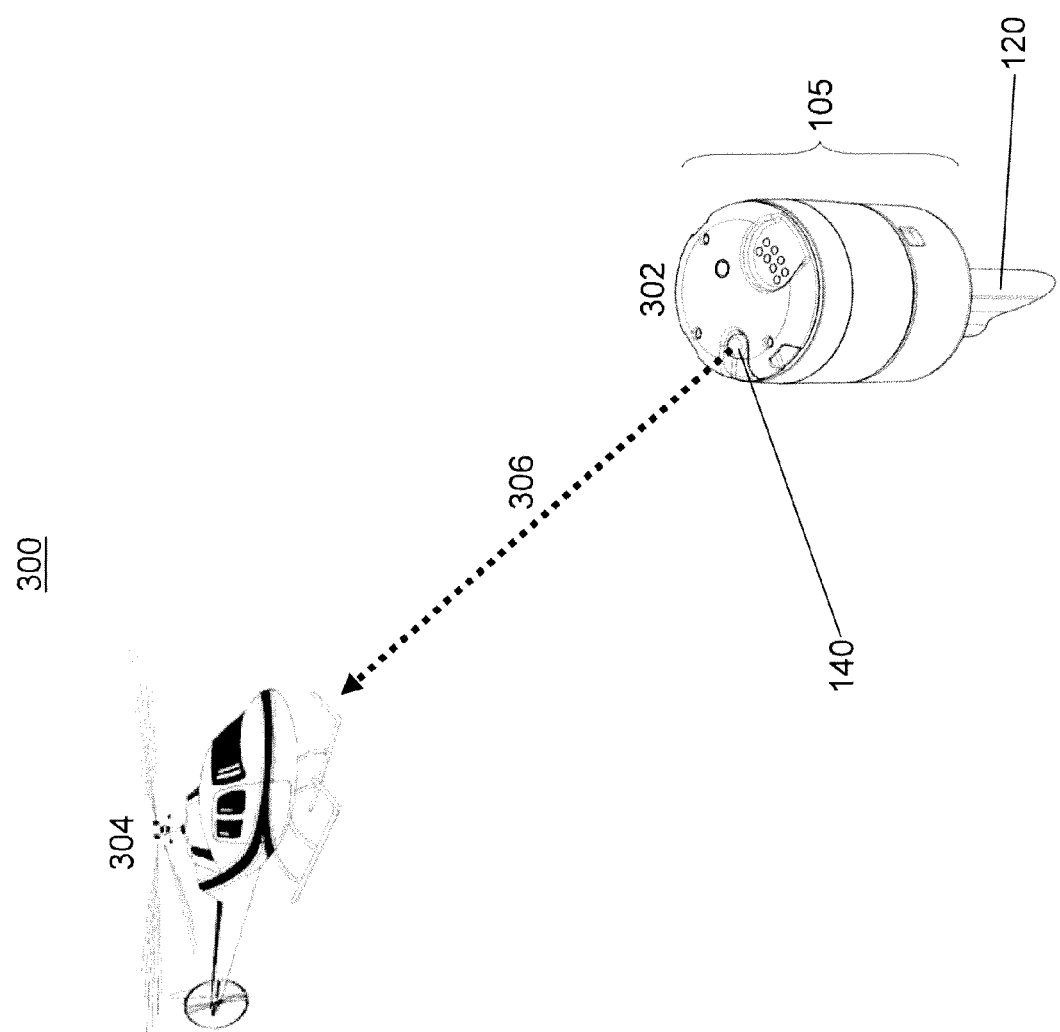
FIG. 3 is a depiction of a system for communicating data between a seismic acquisition unit and a remote vehicle, according to an illustrative implementation.

FIG. 3 is a depiction of a system 300 for communicating data between a seismic acquisition unit 302 and a remote vehicle 304, according to an illustrative implementation. The system includes a seismic acquisition unit 302, which may be an implementation of either of the seismic acquisition units 100 and 200 discussed above. For simplicity, not all of the features of the unit 302 are labeled in FIG. 3. The unit 302 includes a closed case 105 containing at least one seismic sensor and associated electronics, and a stake 120 for supporting the unit 302 and mechanically coupling the unit 302 to the ground. For some seismic applications, it is desirable for the case to exhibit radial symmetry. For example, radial symmetry can help to reduce distortion in the seismic activity detected by the case. In some implementations, the case 105 can be substantially cylindrical in shape. In other implementations, the outer edge of the case 105 can include flat walls, such that the case 105 has a polygonal cross-section. For example, the case 105 can have a square, hexagonal, octagonal, or other polygonal cross-section. The lengths of the sides in case 105 having a polygonal cross-section can be equal, allowing the case to approximate the radial symmetry of a cylinder. That is in some embodiments, the case 105 may be symmetric or substantially symmetric under rotations about a central axis, either continuously or by discrete angles. An LED 142 is located on a top surface of the unit 302. The system 300 also includes a remote vehicle 304.

In some implementations, the unit 302 may be deployed for use in an undeveloped area, such as a forest, making it difficult for technicians to physically access the unit 302 in the field. Additionally, there may be a great number of units 302 installed over a large geographical area, such that physically accessing each unit 302 would be very time consuming and expensive. Therefore, the system 300 can be useful because it provides a method of accessing data from the unit 302 remotely.

As described above in connection with FIG. 1A, the LED 142 can be used to wirelessly transmit data from the unit 302 to a remote receiver. For example, in some implementations, the LED 142 can communicate a simple message through the light source 140 in the cap section 115 by turning on and off in a predetermined sequence or by changing the color of the light emitted. Information corresponding to the message can be stored in a memory module within the case 105. In other implementations, the LED can be used to transmit a large amount of data at a high bit rate (e.g., at least 1 MB/s, 10 MB/s, 100 MB/s, 1 GB/s or more). For example, a memory module can include a large amount of seismic data collected by the unit 302, and the LED can transmit information corresponding to the seismic data in the memory module.

A control module can control the output of the LED to transmit the message. In some implementations, if the amount of information to be transmitted is small (e.g., if a simple status message is to be transmitted), the message may be read by a human observer. In other implementations, an optical receiver device can be used to receive the message. For example, an optical receiver device can be included on a remote vehicle, such as the remote vehicle 304. Communication link 306 represents the optical data transmitted from the LED 142 and received by the optical receiver on the remote vehicle 304. The data received at remote vehicle 304 can be stored and subsequently processed, without any need for physically retrieving the unit 302 from the field.

In some implementations, the remote vehicle 304 can be a helicopter or a plane. In other implementations, the remote vehicle 304 can be a land based vehicle such as a truck. The remote vehicle 304 can also be a drone vehicle that is controlled autonomously. While FIG. 3 shows an LED that can be used to wirelessly transmit a message, it will be appreciated by one of skill in the art that any other form of wireless communication could also be used. For example, the unit 302 can include a radio transmitter to communicate data from a memory module to a remote location.

In some implementations, the receiver may not be vehicle mounted, but may instead be included in a hand held unit or other man-carried device.

In some implementations, the unit 300 may also include an light detecting element, thereby allowing two way all optical communication, e.g., with the vehicle 304 or with other units 300 in the area.

In various implementations, the unit 300 may implement the wireless seismic data transmission schemes described in any of the references incorporated above or in U.S. Pat. No. 8,296,068 "Method for transmission of seismic data" issued Oct. 23, 2012, the entire contents of which are incorporated by reference herein.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to and/or receive communications from other devices. The display unit(s) may be provided, for example, to allow a user to view various information in connection with execution of the instructions. The user input device(s) may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system for seismic data acquisition, comprising:
   a seismic data acquisition unit comprising:
      a closed housing containing:
         a seismic sensor contained within the closed housing;
         a processor electrically connected to the seismic sensor;
         a memory electrically connected to the processor that records seismic data from the seismic sensor;
         a power source that powers the seismic sensor, the processor and the memory; and
         a connection port that electrically connects an external seismic sensor located external to the seismic data acquisition unit and the closed housing to the processor contained in the closed housing; and
   the external seismic sensor located external and remote from the seismic data acquisition unit, the external seismic sensor connected to the connection port via an auxiliary cable.

2. The system of claim 1, wherein the seismic sensor, the processor, the memory and the power source are configured to be assembled as an operable unit in the absence of the closed housing.

3. The system of claim 1, wherein the closed housing comprises a cap having one or more pins that provide electrical connection to one or more elements contained in the closed housing.

4. The system of claim 3, further comprising:
a flexible electrical connector member disposed under the cap in the closed housing configured to provide electrical connection between the one or more pins and the one or more elements contained in the closed housing;
wherein the flexible electrical connector member is configured to flex in response to a deformation of the cap without causing an interruption of the electrical connection between the one or more pins and the one or more elements contained in the closed housing.

5. The system of claim 1, further comprising the connection port configured to electrically connect a plurality of external seismic sensors to the processor contained in the closed housing, the plurality of external seismic sensors located external to the closed housing.

6. The system of claim 1, further comprising a light emitting element included in the closed housing and electrically connected to the processor.

7. The system of claim 6, wherein the processor is configured to modulate output of the light emitting element to transmit data to a receiver external to the seismic sensor.

8. The system of claim 7, wherein the receiver external to the seismic sensor is mounted on a vehicle.

9. A system, comprising:
a closed housing containing:
a seismic sensor contained within the closed housing;
a processor electrically connected to the seismic sensor;
a memory electrically connected to the processor that records seismic data from the seismic sensor;
a power source that powers the seismic sensor, the processor and the memory;
a light emitting element included in the closed housing and electrically connected to the processor, the processor configured to modulate output of the light emitting element to transmit data to a receiver external to the seismic sensor; and
a connection port that electrically connects an external seismic sensor located external to the closed housing to the processor contained in the closed housing;
the external seismic sensor located external to the closed housing, the external seismic sensor connected to the connection port via an auxiliary cable; and
the receiver.

10. A method, comprising:
deploying a seismic data acquisition unit comprising:
a closed housing containing:
a seismic sensor contained within the closed housing;
a processor electrically connected to the seismic sensor;
a memory electrically connected to the processor that records seismic data from the seismic sensor;
a power source that powers the seismic sensor, the processor and the memory; and
a connection port that electrically connects an external seismic sensor located external to the seismic data acquisition unit and the closed housing to the processor contained in the closed housing;

providing the external seismic sensor located external to the seismic data acquisition unit, the external seismic sensor connected to the connection port via an auxiliary cable; and
acquiring seismic data using the seismic data acquisition unit.

11. A system for ambidextrous seismic data acquisition, comprising:
an ambidextrous seismic data acquisition unit comprising:
a closed housing containing:
a seismic sensor contained within the closed housing;
a processor electrically connected to the seismic sensor;
a memory electrically connected to the processor that records seismic data from the seismic sensor;
a power source that powers the seismic sensor, the processor and the memory; and
a connection port that electrically connects an external seismic sensor located external to the closed housing to the processor contained in the closed housing; and
the external seismic sensor located external to the ambidextrous seismic data acquisition unit, the external seismic sensor connected to the connection port via an auxiliary cable.

12. The system of claim 11, wherein the ambidextrous seismic data acquisition unit further comprises: the connection port to electrically connect a plurality of external seismic sensors to the processor, the plurality of external seismic sensors located external to the closed housing.

13. The system of claim 11, wherein the seismic sensor, the processor, the memory, and the power source are configured to be assembled as an operable unit in the absence of the closed housing.

14. The system of claim 11, wherein the closed housing comprises a cap having one or more pins that provide electrical connection to one or more elements contained in the closed housing.

15. The system of claim 14, wherein the ambidextrous seismic data acquisition unit further comprises:
a flexible electrical connector member disposed under the cap in the closed housing configured to provide electrical connection between the one or more pins and the one or more elements contained in the closed housing;
wherein the flexible electrical connector member is configured to flex in response to a deformation of the cap without causing an interruption of the electrical connection between the one or more pins and the one or more elements contained in the closed housing.

16. The system of claim 11, wherein the ambidextrous seismic data acquisition unit further comprises a light emitting element included in the closed housing and electrically connected to the processor.

17. The system of claim 16, wherein the processor is configured to modulate output of the light emitting element to transmit data to a receiver external to the seismic sensor.

18. The system of claim 17, wherein the receiver external to the seismic sensor is mounted on a vehicle.

19. A system, comprising:
a closed housing containing:
a seismic sensor contained within the closed housing;
a processor electrically connected to the seismic sensor;
a memory electrically connected to the processor that records seismic data from the seismic sensor;
a power source that powers the seismic sensor, the processor and the memory; and a connection port that electrically connects an external seismic sensor located external to the closed housing to the processor contained in the closed housing;

a light emitting element included in the closed housing and electrically connected to the processor, wherein the processor is configured to modulate output of the light emitting element to transmit data to a receiver external to the seismic sensor, the receiver mounted on a vehicle;

the external seismic sensor located external to the closed housing, the external seismic sensor connected to the connection port via an auxiliary cable; and the receiver.

20. A method, comprising:

deploying an ambidextrous seismic data acquisition unit comprising:

a closed housing containing:

a seismic sensor contained within the closed housing;

a processor electrically connected to the seismic sensor;

a memory electrically connected to the processor that records seismic data from the seismic sensor;

a power source that powers the seismic sensor, the processor and the memory; and a connection port that electrically connects an external seismic sensor located external to the closed housing to the processor contained in the closed housing;

providing the external seismic sensor located external from the ambidextrous seismic data acquisition unit, the external seismic sensor connected to the connection port via an auxiliary cable;

acquiring seismic data using the ambidextrous seismic data acquisition unit;

reconfiguring the ambidextrous seismic data acquisition unit by electrically connecting a second seismic sensor to the processor via the connection port; and acquiring additional seismic data using the ambidextrous seismic data acquisition unit reconfigured with the second seismic sensor electrically connected to the processor via the connection port.

\* \* \* \* \*